_United States Patent Office_

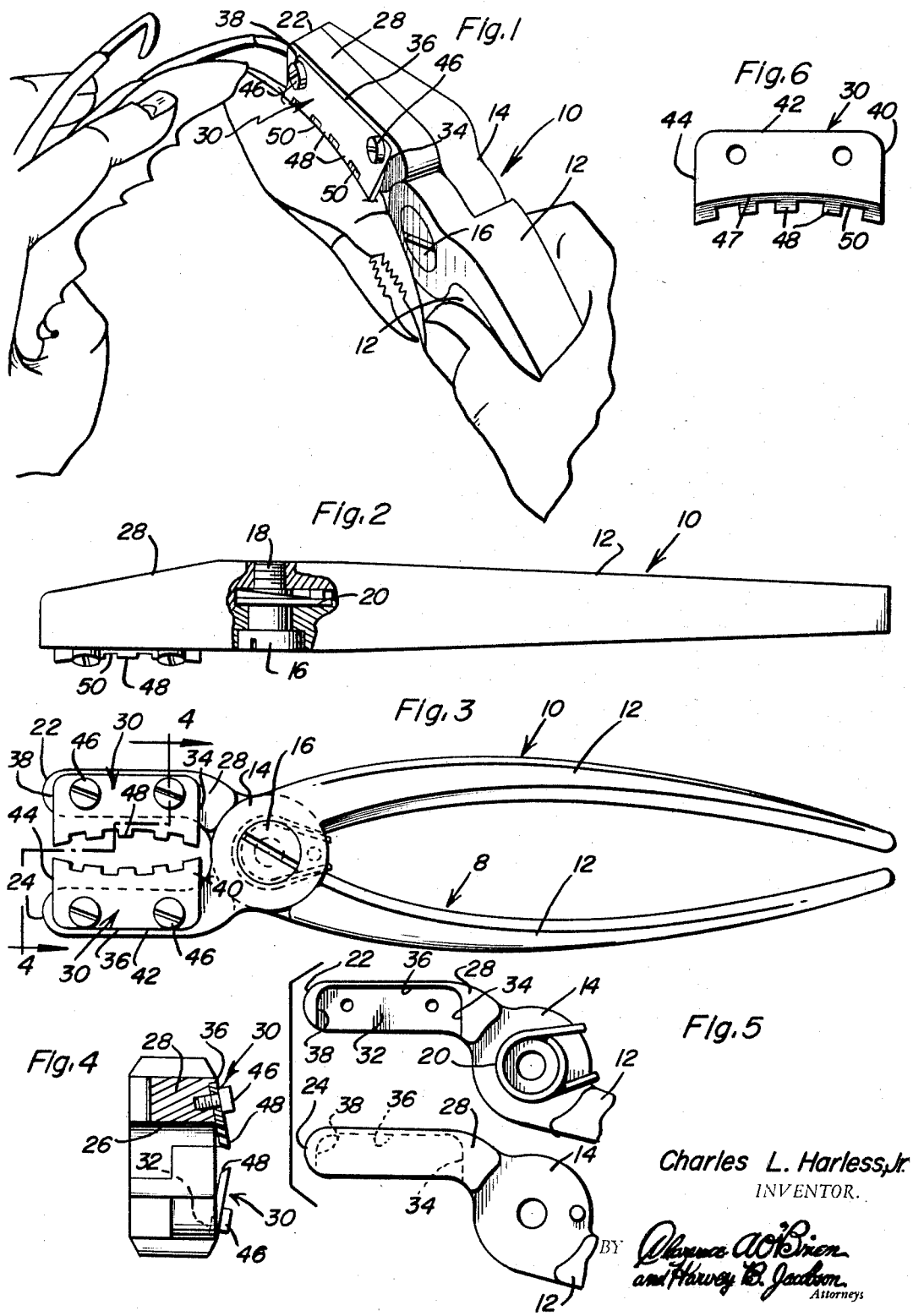

3,395,421
Patented Aug. 6, 1968

3,395,421
LOBSTER AND CRAB CLAW SHELL CRACKING TOOL
Charles L. Harless, Jr., Box 928,
San Angelo, Tex. 76901
Filed Dec. 7, 1965, Ser. No. 512,185
2 Claims. (Cl. 17—7)

ABSTRACT OF THE DISCLOSURE

The pliers-type hand-tool disclosed embodies pivoted lever units having spring-opened handles and jaws. Unique jaws serve to grippingly clench and crack lobster and crab claws. Corresponding side surfaces of the jaws are recessed to define three thrust distributing shoulders; namely, a pair of spaced parallel transverse shoulders and a longitudinal shoulder therebetween. The blade lodged in the recess has three marginal edges abutting the respective stabilizing shoulders. The longitudinal marginal edge portion is flush with the surface of the coacting longitudinal shoulder.

---

The present invention relates to a pliers-type hand tool for handling, clenching, cracking and assisting one in peeling and otherwise removing the cracked shell portions of lobsters and crab claws.

The object of the invention is to provide a simple, practical and easy-to-use tool which resembles a pair of pliers, said tool characterized by a pair of lever units having corresponding median portions crossing each other and pivotally joined together in united overlapping relationship. Each unit embodies an elongated handle which has a clenching and claw handling jaw at the outer end. The handles are opposed to each other and are situated on one side of the pivot point or joint. The jaws are located at the opposite side of the pivot joint, said pivot joint including spring means for biasing the jaws and handles to normal spread-apart relationship. In carrying out the invention the jaws are elongated, substantially rectangular in cross-section and are provided with duplicate anvil-like shell-engaging and squeezing as well as cracking faces. These faces are opposed to each other and in addition there are elongated side faces which are at right angles to the cracking faces and which are generally parallel to each other. The side faces at corresponding lengthwise sides of the jaws have complemental blades which constitute the essential improvements. In other words the jaws are not only provided with generally planar cracking surfaces, the longitudinal side faces are provided with blades. These blades have longitudinal edge portions projecting beyond the shell squeezing and cracking faces and are provided with sharp-edged pincers-like shell gripping and fracturing teeth.

Novelty in particular is predicated on the companion blade-equipped sides of the jaws and particularly wherein these sides have recesses which provide pockets. The major body portions of the blades are keyed or seated in these pockets and screwed or otherwise removably fastened in place.

Particular novelty is predicated on having the major body portion of each blade fastened within the confines of its recess and with the marginal edge of the blade cooperating with the three encompassing shoulder-like edges of the recesses for equalized stability.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a lobster and crab claw shell cracking and handling tool embodying the invention with portions of the handles broken away and showing how the gripping and shell-cracking step is capable of accomplishment;

FIGURE 2 is a plan view with portions broken away and appearing in section;

FIGURE 3 is a side elevational view of the complete ready-to-use tool with the jaws and added shelling or cracking blades pressed together;

FIGURE 4 is a section on the irregular section line 4—4 of FIGURE 3;

FIGURE 5 is an exploded view in elevation showing the jaws proper with the blades omitted; and FIGURE 6 is a view in elevation of one of the blades.

Referring now to the drawing the two substantially duplicate aluminum or equivalent one piece lever units are denoted at 8 and 10, said units having suitably shaped and curved elongated handles 12 at one end, having intermediate disk-like portions 14 which are overlapped and assembled and pivotally connected by a jointing and pivoting bolt or equivalent member 16 threaded in place as generally denoted at 18 and equipped in any suitable manner with spring means 20 which coacts with the adjacent shouldered portions to exert yieldable pressure on the shoulders and in this manner to normally spread the handles 12 and also the opposed elongated jaws 22 and 24 (see FIG. 5) apart. Each jaw has a blunt or rounded free end portion at the left in FIG. 5 and has opposed generally planar or flat main jaw surfaces 26 (see FIG. 4) which are movable toward and from each other. So far it will be evident that the two pivoted handle-equipped and jaw-equipped units 8 and 10 are in structural resemblance of and comparable to an ordinary pair of pliers. The fact is some people use lightweight pliers for cracking and shelling crabs, more particularly the difficult-to-crack and often tough claw portions. It has been found, however, that by using the elongated jaws 22 and 24 their function and cracking power can be greatly increased by providing the elongated flat faces 26 with specially constructed and toothed cracking and crushing blades 30. Since each jaw side and each blade is the same in construction it is believed that a description of one can suffice for both. Starting with the side face on which the complemental clip-like blade is detachably mounted, it will be seen as shown in FIG. 5 that this face is provided with an elongated recess or cavity 32 having several marginal edges defining three blade orienting and retaining shoulders 34, 36 and 38. As shown in FIG. 4, the recess defines a bottom of said pocket and the pocket slopes from the lengthwise overall dimension of the tool outwardly. In other words, the two pockets 32 are such that when the blades 30 are seated or keyed therein they coact in outwardly diverging relationship. Each blade has a size and thickness to be fitted conformingly in the pocket provided. More specifically each blade has edges 40, 42 and 44 which abut the cooperating shoulder edges 34, 36 and 38 when the body part of the blade is seated in the cavity and fastened by screws or equivalent fasteners 46 (see FIG. 4). It will be noted that one marginal edge is longitudinally bowed or arcuate as at 47 in FIG. 6 and this edge is beveled from end to end and is then serrated or notched to define a series of beveled saw-like teeth 48 and intervening notches 50. It will also be noted that the transverse cross-sectional dimension of the longitudinal shoulder 36 corresponds to the thickness of the longitudinal edge portion 42 of the blade 30 and that the oriented surface of said blade is flush with the coordinating surface of the shoulder 36. Then, too, the transverse ends 40 and 44 of the blade abut and are stabilized by the coacting shoulders 34 and 38, respectively.

It will be evident from the views of the drawing and a description of the details or components thereof that the crosssed hinged spring-biased lever units constitute and resemble an ordinary pair of pliers and that the essence of the invention has to do with the provision of the two openable and closable elongated jaws 28 which have opposed surfaces 26 and cavities or pockets in corresponding sides to accommodate the attachable and detachable (high carbon tool steel, tempered, plated and sharpened) clenching and cracking blades 30. It follows that jaws equipped with these added toothed blades permit using the same in the manner suggested in one instance in FIG. 1. Particularly, however, it will be noted that the width or depth of the blades are such that the toothed edges project beyond the main jaw faces 26 so that the toothed edges are available without interference from the surfaces 26 to catch hold of hard-to-break portions of the shell whereupon the desired cracking step can be carried out after which the shell can be peeled off or the meat more readily freed therefrom for consumption.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pliers-type hand-tool for clenching, cracking and peeling the cracked shells from lobster and crab claws comprising: a pair of companion lever units having shouldered portions crossing each other and pivotally joined, each unit embodying an elongated handle having a jaw at an outer end, said pivotal joint embodying spring means biasing the jaws and handles to normal spread apart relationship, said jaws being elongated and substantially rectangular in cross-section and having duplicate anvil-like shell squeezing and cracking faces opposed and operable toward and from each other and having coordinating side faces, each side face having an elongated recess provided with a sloping bottom and providing a pocket, said pocket being adapted to locate, seat and stabilize a renewable blade, one longitudinal edge of said recess being unobstructedly open, the other edges providing three blade positioning, thrust distributing and stabilizing shoulders, namely, a pair of relatively short transverse spaced parallel shoulders and a complemental longitudinal shoulder bridging the space between like ends of said transverse shoulders, a renewable blade, said blade being of a width greater than the width of the recess and having its major body portion seated firmly in said recess and having three marginal edges firmly abutting the respectively cooperable encompassing shoulders and also having a fourth edge projecting through and beyond the open edge of the recess and having sharp-edged pincers-like shell gripping and fracturing teeth, the aforementioned longitudinal shoulder being of a transverse cross-sectional dimension corresponding to the thickness of the adjacent longitudinal edge portion of said blade whereby that surface of said shoulder which is oriented with the exposed exterior surface of said blade is in a common plane and flush with said exterior surface, the transverse edges of said blade being in firm abutting relationship with the respectively cooperable transverse shoulders.

2. The hand-tool defined in and according to claim 1, and wherein the bottom of each recess has screw-threaded sockets drilled therein and precisely located relative to each other and the coordinating longitudinal and transverse shoulders, said blade having holes pre-formed and aligned with their respective sockets, and screw-threaded headed fasteners having shank portions passing through said holes and screwed into their respectively cooperable sockets.

References Cited

UNITED STATES PATENTS 2,651,342  9/1953  Harless _____ 146—13
2,654,120  10/1953 Tifft _____ 17—7

FOREIGN PATENTS 20,790  11/1910  Norway.

LUCIE H. LAUDENSLAGER, *Primary Examiner.*